United States Patent [19]

Arakawa et al.

[11] Patent Number: 4,944,229
[45] Date of Patent: Jul. 31, 1990

[54] AUTOMOTIVE CARRIER TYPE CONVEYING APPARATUS

[75] Inventor: Masayasu Arakawa; Teruhisa Katsumata; Yoshimasa Ota, all of Sayama, Japan

[73] Assignee: Honda Giken Kogyo Kabushiki Kaisha, Tokyo, Japan

[21] Appl. No.: 342,194

[22] Filed: Apr. 24, 1989

[30] Foreign Application Priority Data

Apr. 27, 1988 [JP] Japan .................. 63-102640
Apr. 30, 1988 [JP] Japan .................. 63-108331

[51] Int. Cl.$^5$ .................................... B61B 13/00
[52] U.S. Cl. ........................... 104/137; 104/172.3; 104/287; 414/495
[58] Field of Search ............. 104/137, 139; 105/133, 105/157.1, 29.1, 26.05, 28; 106/287, 288, 165, 172.1, 172.3, 172.4; 414/495

[56] References Cited

U.S. PATENT DOCUMENTS

| 1,000,742 | 8/1911 | McKay ............... 104/139 |
| 1,766,538 | 6/1930 | Prescott ............. 104/137 |
| 3,010,410 | 11/1961 | Daniels ............. 104/137 |
| 3,410,223 | 11/1968 | Miller ............. 104/139 X |
| 3,518,946 | 7/1970 | Kavieff ............ 104/172.3 |
| 3,891,108 | 6/1975 | Traficant ......... 414/495 X |
| 3,906,866 | 9/1975 | Knippel ............ 104/139 |
| 4,542,698 | 9/1985 | Wakabayashi ...... 104/172.3 |
| 4,564,100 | 1/1986 | Moon ............. 104/172.3 X |
| 4,576,098 | 3/1986 | Belanger et al. ... 104/172.3 |
| 4,616,570 | 10/1986 | Dehne ............. 104/172.3 |

FOREIGN PATENT DOCUMENTS 48-59511 8/1973 Japan .

*Primary Examiner*—Douglas C. Butler
*Attorney, Agent, or Firm*—Armstrong, Nikaido, Marmelstein, Kubovcik & Murray

[57] ABSTRACT

A conveying carrier is arranged to be self-propelled and move along a conveying passage having a pit formed therebelow. A track covers the top side of the pit flush with the road surface of the conveying passage. A plurality of wheels are attached to the conveying carrier with at least the front wheels being casters. A steering frame is pivotally supported on the conveying carrier and is turnable about a vertical steering axis line. A driving wheel and motor are attached to the steering frame, with the driving wheel being positioned to contact the track at a location substantially directly below the vertical steering axis line. A guide member is guided by a guide rail laid in the pit and connected to the steering frame through a slit in the widthwise center of the track. The pit is a substantially U-shaped track frame buried in the widthwise central portion. The track is formed of a pair of cover plates which are detachably mounted on the upper ends of side plates on both sides of the track frame as to leave the slit therebetween.

12 Claims, 7 Drawing Sheets

FIG.2
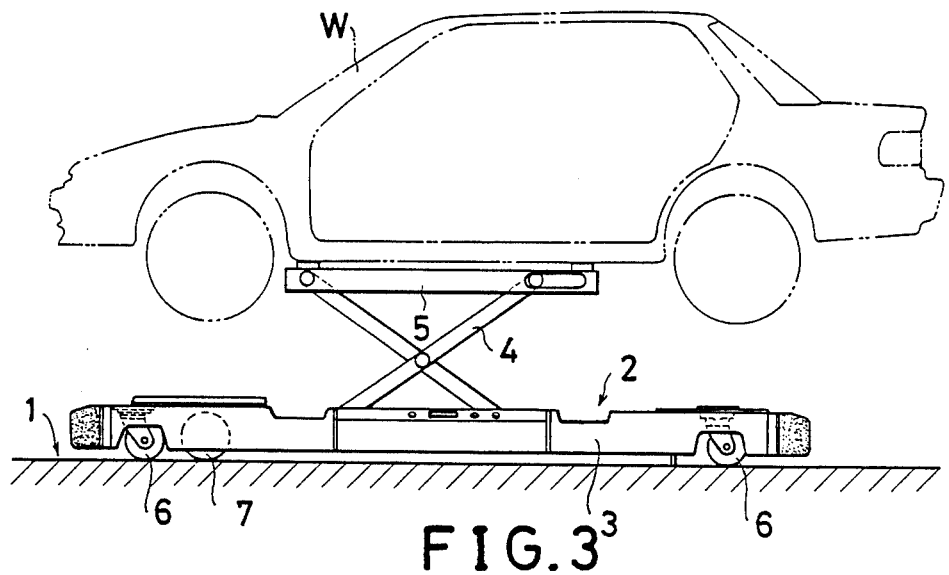
FIG.3
FIG.4
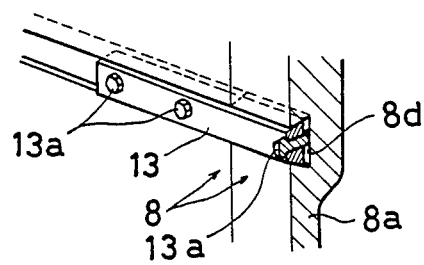

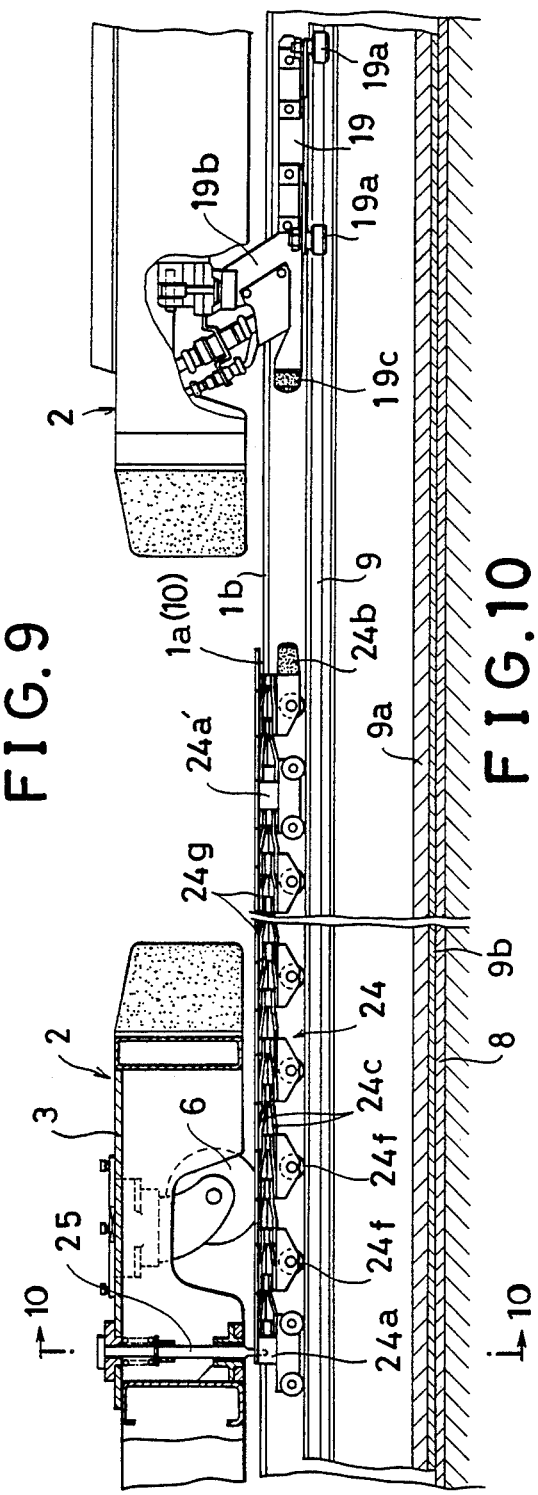
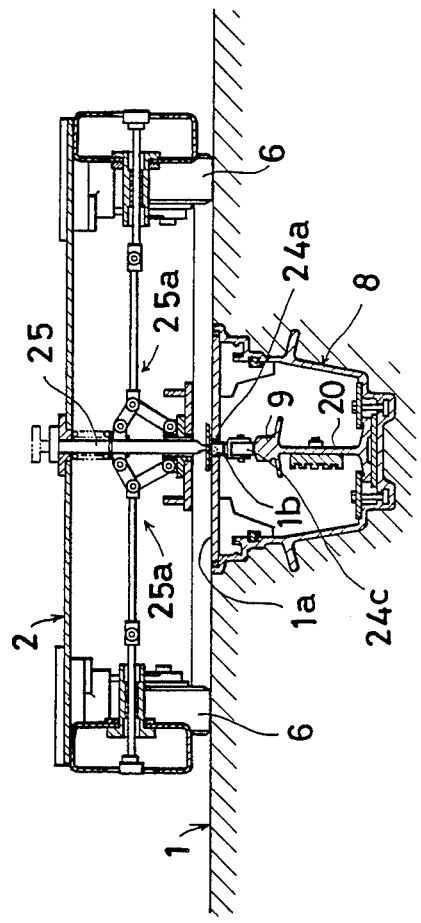

F I G. 11
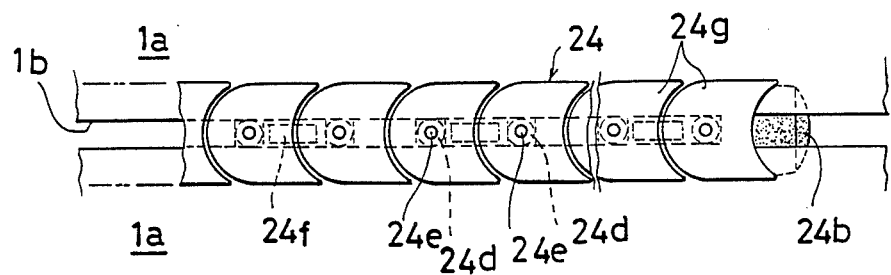
F I G. 12
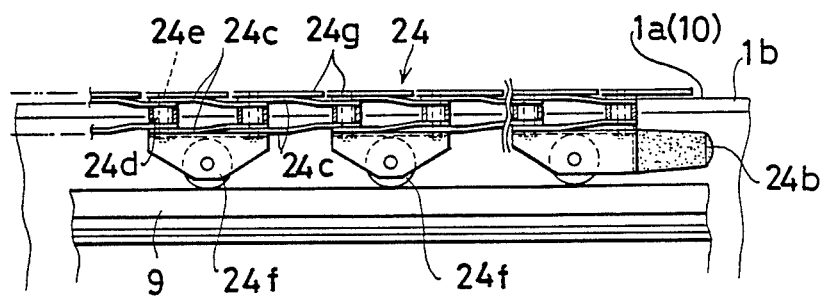

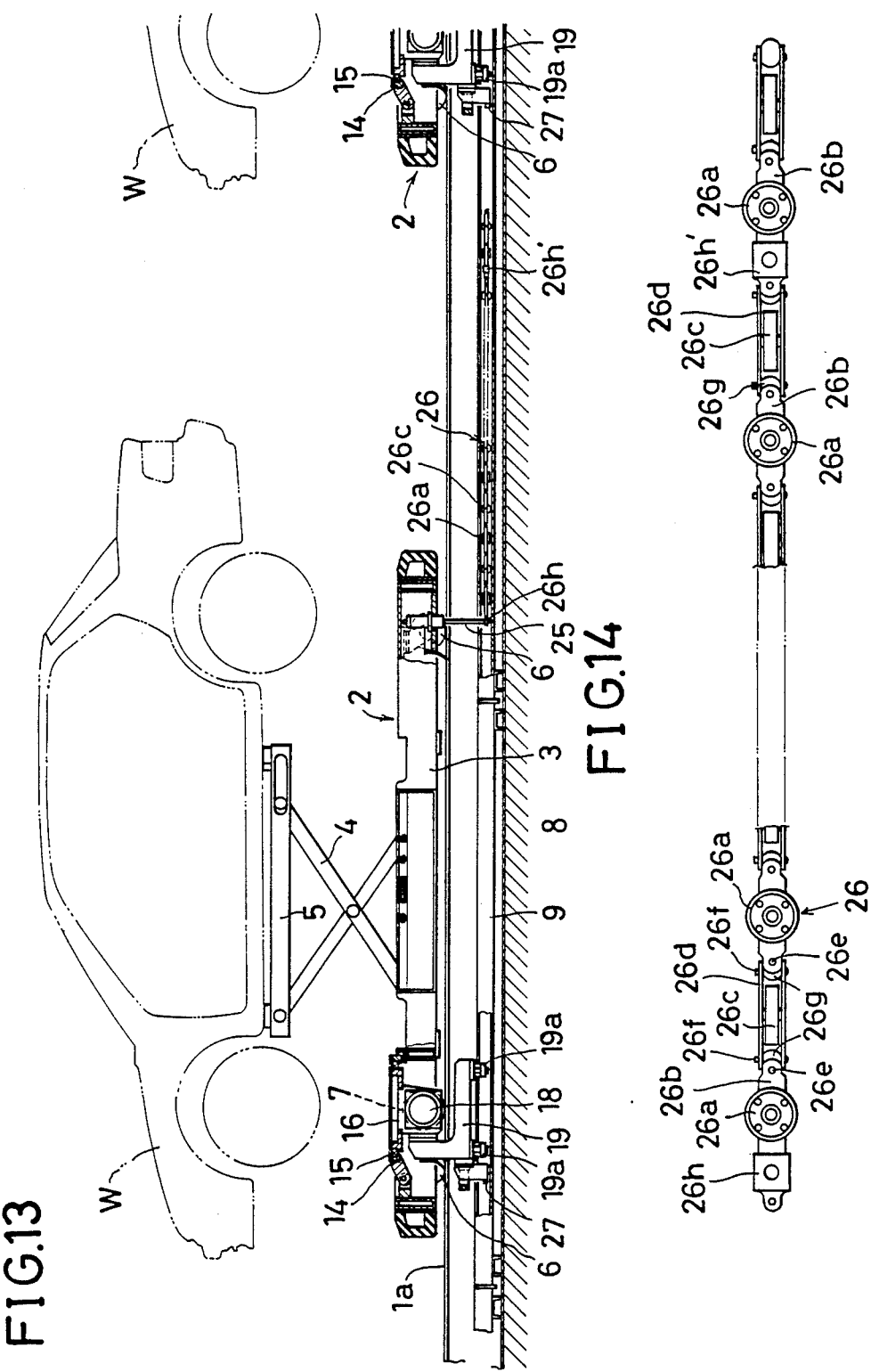

AUTOMOTIVE CARRIER TYPE CONVEYING APPARATUS

BACKGROUND OF THE INVENTION

This invention relates to an automotive carrier type conveying apparatus used in a self-propelled assembly line and more specifically to a conveying apparatus in which a conveying carrier having a load such as a car body or the like placed thereon moves itself along a conveying passage.

A conveying apparatus of this kind has been known heretofore from the Japanese Unexamined Patent Application Publication Tokkaisho No. 48-59511. A pit is formed of a wide channel-shaped track frame whose width extends across the entire width of a conveying passage and which is buried in the passage. A pair of running rails are securely laid on both side walls of the track frame and a guide rail is securely laid along the central portion of the bottom surface of the track frame. A steering frame is pivotally supported on the underside surface of the carrier body of a conveying carrier via a vertical steering shaft. Wheels that roll on along the running rails are pivotally supported on both left and right ends of the steering frame. A pair of front and rear guide rollers adapted to abut against one side surface of the guide rail are also pivotally supported on the steering frame. A swingable frame is provided on the carrier body which is swingable in a lateral direction. The swingable frame is provided with a driving roller abutting on the other side surface of the guide rail. A driving motor for driving the driving roller and the swingable frame are further urged by a spring so that the driving roller is pressed against the guide rail.

In the above-described conventional apparatus, the conveying carrier moves itself along the conveying passage as the driving roller rotates and, at the curved portions of the conveying passage, a reaction force of the pressure contact against the guide rail of the driving roller causes the steering frame to turn so as to have the pair of the guide rollers abut on the guide rail alike, whereby the wheels are changed in their moving direction for steering the conveying carrier at the curved portions.

In the foregoing apparatus, the pit is formed to extend across the entire width of the conveying passage. Therefore, the conveying passage can not be utilized additionally as a working space. Further, since it is arranged to receive load at the wheel attached to the steering frame, resistance to turning of the steering frame is increased to adversely affect the smooth steering operation thereof. It also requires, in addition to the steering frame, a swingable frame with a driving roller attached to the carrier body, thus resulting in a more complex structural arrangement which is a disadvantage.

In view of the foregoing, the present invention has for its object to provide a conveying apparatus of simplified structure in which a conveying passage is formed flat so as to be concurrently utilized as a working space and in which steerability of a conveying carrier is improved.

SUMMARY OF THE INVENTION

To achieve the above object, the present invention provides a conveying apparatus in which a conveying carrier is arranged to move itself along a conveying passage. A pit is formed at the widthwise center portion of the conveying passage. A guide rail is laid within the pit. A track is formed to cover the top side of the pit in such a manner as to be flush with the road surface of the conveying passage. A slit is formed at the widthwise center of the track with the slit communicating with the pit. A plurality of wheels are attached to the conveying carrier to contact the road surface of the conveying passage. At least the front wheels are casters. A steering frame is pivotally supported on the conveying carrier and is turnable about a vertical steering axis line. A driving wheel and a motor for driving the driving wheel are attached to the steering frame, with the driving wheel being positioned to contact the track at a location substantially directly below the vertical steering axis line. A guide member is guided by the guide rail for movement and is connected to the steering frame through the slit. In order to facilitate construction work of the conveying passage and maintenance work within the pit, it is desirable to have the pit constructed of a substantially U-shaped track frame buried in the widthwise central portion of the conveying passage. It is also desirable to have the track formed of a pair of cover plates which are detachably mounted on the upper ends of side plates on both sides of the track frame to leave a slit therebetween. In this case, it is further desirable to arrange the track frame to comprise an extruded material formed to have on the inner sides thereof continuous dovetail grooves extending in the longitudinal direction and to have one track frame connected to the other track frame by way of a dovetail-shaped joint member which engages with the dovetail grooves of both of the track frames at the joint portions. In addition, it is even more desirable to have the track frame provided with a channel groove capable of receiving therein nuts for fastening the guide rail to the track frame, with the channel groove being formed continuously in the longitudinal direction of the track frame.

For the driving wheel to have an adequate ground- or road-contact load, it is desirable to pivotally support the steering frame on a moveable frame which is provided on the carrier body of the conveying carrier in such a manner that it may be urged downward by an urging means. In this case, it is even more desirable to pivotally support the movable frame at one of its front and rear ends on the carrier body in such a manner that it may be vertically swingable, and to provide an elastic member fitted to the pivotally supported portion thereof so as to allow the movable frame to tilt in the widthwise direction with respect to the carrier body. Further, it is desirable to make the guide member separable from the steering frame and provide a control member for lifting up the movable frame against the urging means.

In order to further improve steerability of the conveying carrier, it is preferable to use a caster for every one of the wheels attached to the conveying carrier, additionally provide a second guide member whose movement is guided by the slit or the guide rail, and further provide the conveying carrier with an engagement member for engaging with the second guide member, the engagement member being located to be spaced from the driving wheel in the longitudinal direction.

When each of the conveying carriers is carrying thereon a work or workpiece which is longer than the conveying carrier itself, the work pieces on two adjacent conveying carriers can collide with each other as the two get closer to each other. In order to avoid such collision, a conventional conveying apparatus is arranged such that one of the conveying carriers is provided at the front or rear end thereof with a rod-like stopper projecting from the front or rear end while the other conveying carrier is provided with a corresponding stopper receiver at the location thereof that is opposite to the location at which the stopper is provided on the one conveying carrier, so that a proper distance can be maintained between the two conveying carriers. In this arrangement, however, the necessary distance between the two carriers can not be maintained if the stopper of the one carrier fails to be aligned with the corresponding stopper receiver of the other carrier at the curved portions of the conveying passage.

To solve such an inconvenience problem as the above, according to the present invention, there is further provided a chain which is guided by the slit or the guide rail when moving, one end of the chain being connected to the conveying carrier in such a manner as to have the other end thereof located in front of or at the rear of the carrier. Another conveying carrier immediately preceding or following the first conveying carrier is provided with a position control member facing the other end of the chain. In this case, the second guide member composed of a chain can concurrently serve as the chain.

The conveying carrier automotively runs on the road surface of the conveying passage as the driving wheel rotates. At the curved portions of the conveying passage, the steering frame of the conveying carrier is turned via the guide member guided by the guide rail built in the pit so that the driving wheel is steered to be oriented in the tangential direction of the track provided along the central portion of the conveying passage. Then, affected by the driving force in the tangential direction of the driving wheel, the front wheels constituted by casters change their moving directions to perform steering of the conveying carrier.

Since, in this arrangement, the weight of the conveying carrier including a load such as a workpiece mounted thereon is borne by the wheels attached to the carrier body, the weight of the carrier does not affect the driving wheel directly. In addition, the driving wheel is further arranged to make contact with the track at a location practically directly below the vertical steering axis line. All these combine to reduce reaction force of the driving wheel steering, the reaction force constituting resistance to turning of the steering frame, and enable the steering frame to be smoothly turned according to the guide rail for improved steerability, thus ensuring the conveying carrier to run smoothly even at the curved portions of the conveying passage.

The conveying passage including the track is formed flat over the entire width so as to allow an assembly worker to perform his work while standing on the conveying passage.

Further, according to the present invention, the urging force of the urging means acts on the driving wheel through the movable frame and the steering frame in order for the driving wheel to be provided with an appropriate road-contact load necessary to avoid slipping. According to the present invention, even when the carrier body becomes slanted as a result of the wheels picking up undulations of the road surface of the conveying passage, the slant of the carrier body is absorbed by the elastic member, so that the driving wheel is kept in stable contact with the track. This prevents slipping of the driving wheel that could otherwise result from one side thereof being floating or out of contact with the road surface.

According to the present invention, the guide frame can be separated from the steering frame while the movable frame can be lifted up by means of the control member to lift off the driving wheel from the track. This arrangement makes it possible to move the conveying carrier freely, so that when the conveying carrier gets out of order it can be easily taken out of the conveying passage.

According to the present invention, turnability or steerability of the conveying carrier is improved by using a caster for every one of the wheels. Further, the conveying carrier is guided by two guide members disposed at two locations spaced from each other in longitudinal direction, so that the conveying carrier can be guided thereby to move accurately along the conveying passage even when the passage is complicatedly curved or winding.

According to the present invention, the chain is guided by the slit and/or the guide rail as it moves following the conveying carrier and at a curved portion of the conveying passage the chain becomes bent in accordance with curvature of that portion so that the other end of the chain may be able to face correctly the position control member of the adjacent conveying carrier even at the curved portion, thereby keeping the necessary distance between the two adjacent conveying carriers.

In a conventional conveying apparatus of this kind in which a pit is formed by burying a wide track frame covering the entire width of the conveying passage, a larger track frame is used and the carrier weight is applied to the track frame through the running rails securely laid thereon. This necessitates reinforcing the track frame, thus entailing a large-scale underground construction work.

Compared with the prior art, the conveying apparatus according to the present invention has a pit formed only at the widthwise central portion of the conveying passage so that a smallsized, narrower track frame is enough to form the pit. In addition, since the wheels attached to the carrier body to bear the whole weight of the conveying carrier contact the road surface outside of the track of the conveying passage, the track frame is not subjected to such a large load and consequently the pit can be constructed simply by burying a track frame in the central portion of the conveying passage without any special reinforcement. Furthermore, according to the present invention the track provided at the center of the conveying passage to cover the pit is formed of cover plates detachably fitted to the upper ends of both side plates of the track frame, so that the cover plates can be readily removed to facilitate maintenance work inside the pit.

According to the present invention, when connecting two track frames to each other, one end of the dovetail-shaped joint member is fitted into the dovetail groove of one track frame of the two so that the joint member is positioned to be set accurately in two directions perpendicular to the longitudinal direction of the track frame, namely the vertical and lateral directions with respect to the track frame, while the other of the two track frames becomes positioned accurately in the vertical and lateral directions with respect to the joint member as the other end of the joint member is fitted into the dovetail groove of the other track frame. This enables both track frames to be connected with each other accurately without possible vertical and lateral misalignments with each other.

Furthermore, it is desired to have the guide rail detachably provided on the track frame for convenience of maintenance work involved. One way to meet such desire may be that screw holes are bored in the track frame and the guide rail is fastened thereto by inserting bolts into these holes. However, such a measure should require a considerable time and labor to bore these screw holes and therefore result in a cost increase. Compared with the above measure, the present invention provides the conveying apparatus in which, as described in the foregoing, the channel groove is formed in the track frame and the guide rail is easily attached to the track frame by fastening the same to nuts retained in said channel groove. This makes it unnecessary to bore screw holes in the frame and thus contribute to cost reduction.

It should be noted here that the above-mentioned dovetail grooves and channel grooves are formed when the track frame is manufactured by an extrusion molding process, so that there arises no problem of cost increase that can result from additional working processes.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 2 is a side view thereof;

FIG. 3 is a transverse sectional view of the conveying passage;

FIG. 4 is a perspective view of an important part of the joint portion of the track frame;

FIG. 9 is a longitudinal sectional view of the rear portion of the conveying carrier;

FIG. 10 is a transverse sectional view taken along the line 10—10 in FIG. 9;

FIG. 11 is a top plan view of the chain;

FIG. 12 is a side view thereof;

FIG. 13 is a sectional side view of an apparatus according to another embodiment of the present invention; and FIG. 14 is a top plan view of a chain used therein.

DETAILED DESCRIPTION OF PREFERRED EMBODIMENTS

Figure 1:
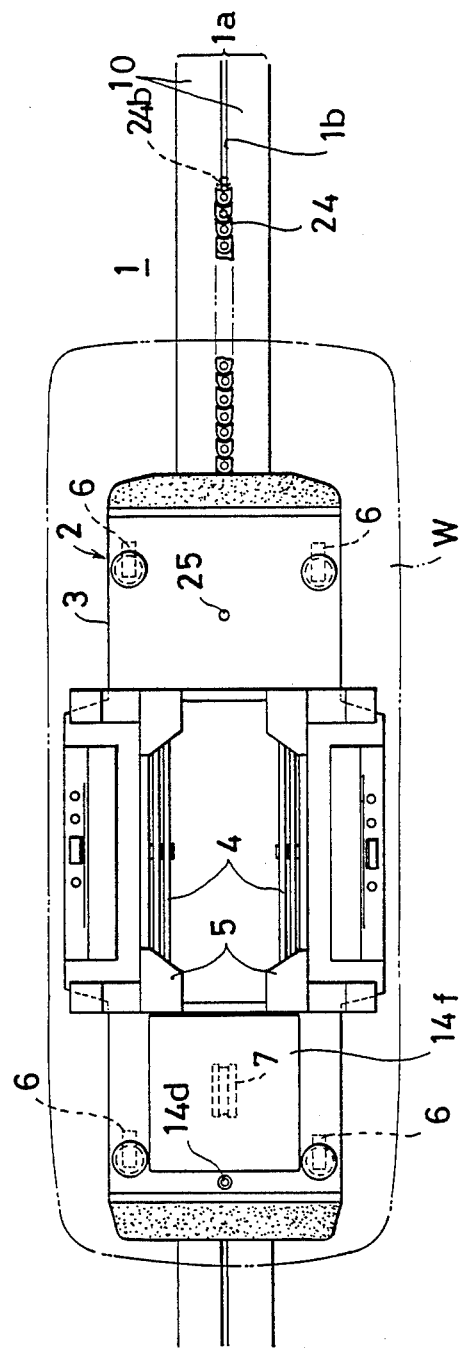
FIG. 1 is a top plan view of an apparatus according to one embodiment of the present invention.

The accompanying drawings show different embodiments of the present invention in which an apparatus according to the present invention is applied to an automobile assembling line for assembling various component parts to a car body W. Referring to FIGS. 1 and 2, a conveying passage 1 is provided along an assembly line, and has a conveying carrier 2 thereon. The conveying carrier 2 comprises a carrier body 3, an X-shaped link mechanism 4, and a support table 5 for carrying the car body W thereon. The support table is mounted on the carrier body 3 via the X-shaped link mechanism and can be vertically raised and lowered.

Four wheels are attached to the underside surface of the carrier body 3, two located at the front left and right sides thereof and other two located at the rear left and right sides thereof, which contact the left and right side road surface of the conveying passage 1. A driving wheel 7 is located at the front center portion thereof which will be explained more in detail later, so that the conveying carrier 2 moves itself along the conveying passage to convey the car body W through the assembly line.

As shown in FIG. 3, the conveying passage 1 is provided at its widthwise central portion with a substantially U-shaped track frame 8 buried therein. A guide rail 9 is installed in the pit formed by the track frame 8. A pair of left and right cover 15 plates 10, 10 are detachably mounted on the upper ends of side plates 8a, 8a on both sides of the track frame 8 facing each other with a clearance left therebetween. The cover plates 10, 10 form a track 1a covering the pit and are flush with the road surface of the conveying passage 1 while the clearance between the cover plates 10, 10 constitutes a center slit 1b communicating with the pit.

The track frame 8 is formed of an extruded material and has an upward facing groove 8b formed in the flange portion on the upper end of each side plate 8a. A plurality of engagement pieces 10a are disposed at appropriate intervals on the underside surface of each of the cover plates 10 which engage the groove 8b so as to have each cover plate 10 attached to each side plate 8a. In addition, each of the cover plates 10 is provided at a suitable portion thereof with a lift-up bar 10b so that each of the cover plates 10 may be detached by lifting up the bar 10b. Further, a sectionally inverted T-shaped channel groove 8c is provided at each of both sides on the bottom of the track frame 8, each channel groove opening upwards. For burying the track frame 8, a plurality of nuts 11 are inserted in advance into each channel groove 8c from the longitudinal end of the track frame 8, the guide rail 9 is then seated on the bottom surface of track frame 8 by means of its lower-end flange 9a and a shim plate 9b and thereafter a bolt 12a inserted through a clamping piece 12 which engages with flange 9A is screwed into the nut 11 so as to fasten the guide rail 9 securely in place. A dovetail groove 8d extending in the longitudinal direction is formed on the inner side surface of each of the side surface of each of the side plates 8a of the track frame 8. As shown in FIG. 4, there is further provided at the joint portion connecting two longitudinally adjacent frames 8, 8 a dovetail-shaped joint member 13 designed to engage with the dovetail grooves 8d,8d of the two track frames 8,8. Fastening bolts 13a which can abut against the groove bottom of the dovetail groove 8d are inserted through the joint member 13 by screwing them thereinto so as to have the joint member 13 pressed against the inner surface of each dovetail groove 8d by reaction force coming from fastening of the bolt 13a, whereby the two longitudinally adjacent track frames 8, 8 are jointed to each other in a vertically and horizontally aligned fashion.

Figure 5:
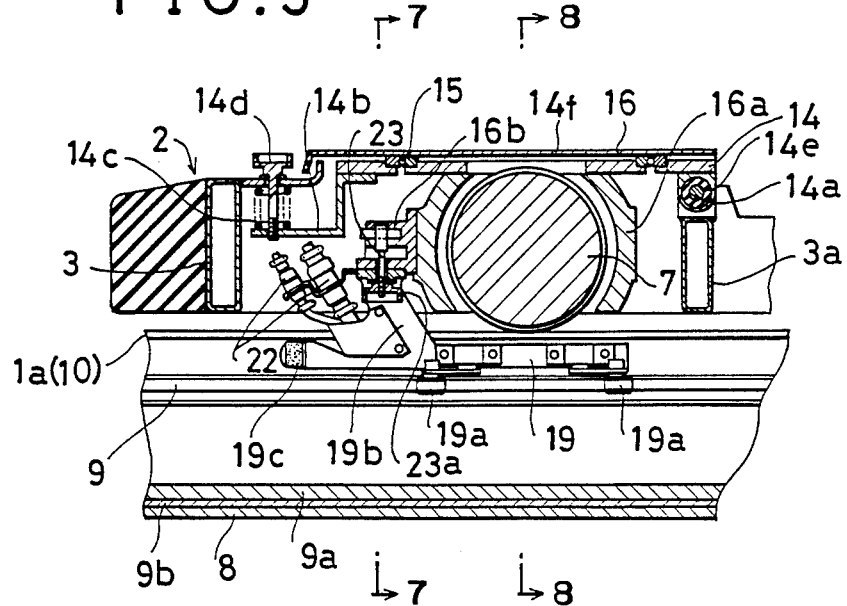
FIG. 5 is a longitudinal sectional view of the front portion of the conveying carrier.
Figure 6:
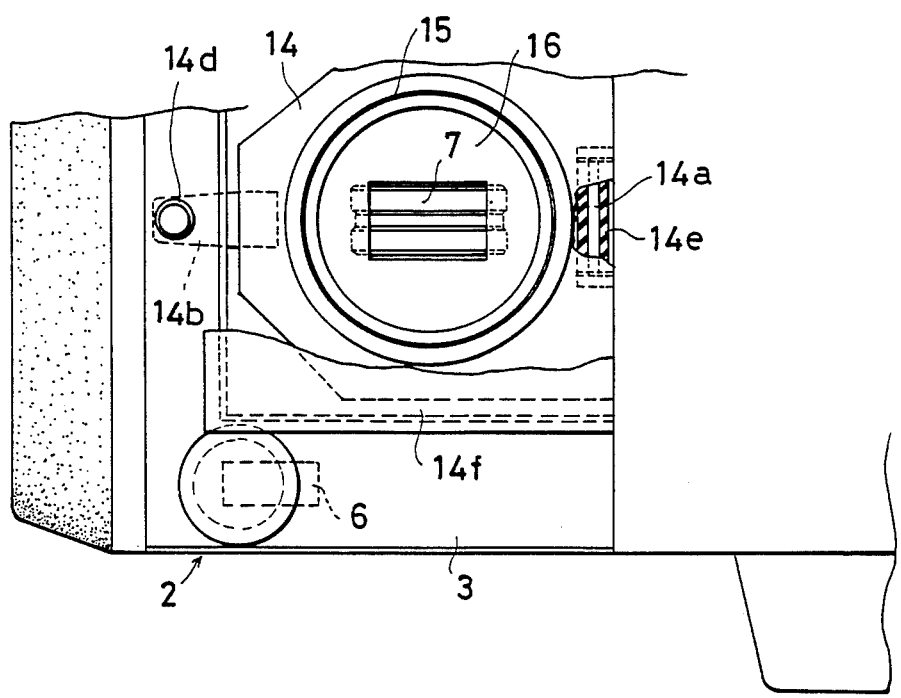
FIG. 6 is a top plan view thereof.
Figure 7:
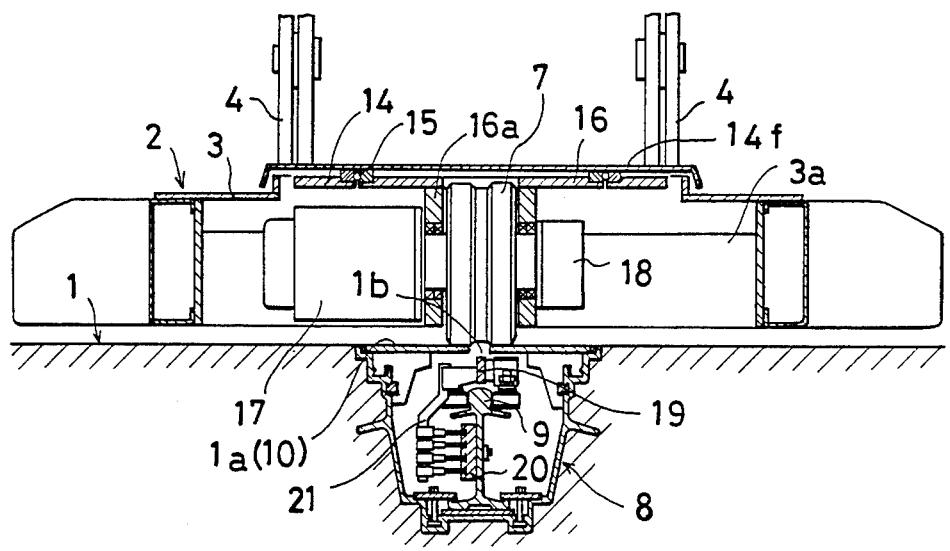
FIGS. 7 and 8 are transverse sectional views taken along the lines 7—7 and 8—8, respectively in FIG. 5.

As shown in FIGS. 5 through 7, the carrier body 3 is provided with a movable frame 14 which is vertically swingable. A steering frame 16 is pivotally supported on the movable frame 14 through a bearing 15 in such a manner that it may be turnable about a vertical steering axis line. In a box-shaped casing 16a fixedly attached to the underside surface of the steering frame 16, the driving wheel 7 is pivotally supported in such a manner that it may contact the track 1a at a location almost directly below the steering axis line. A motor 17 that drives the driving wheel 7 to turn is installed on one side laterally of the casing 16a and a brake 18 is installed on the other side laterally thereof.

The movable frame 14 is pivotally supported at its rear end on a laterally extending shaft 14a provided on a cross frame 3a of the carrier body 3. The movable frame 14 is urged downward by an urging means 14c comprising a coiled spring, the urging means 14c being provided on a tongue-like extension 14b projecting forwardly from the front end of the movable frame, so that the driving wheel 7 is given such an appropriate road-contact load as to prevent slipping. In addition, there is provided a control member 14d comprising a bolt, the control member being so attached to the car body 3 as to be screwed into the extension 14b. Thus, the driving wheel 7 can be lifted off from the track 1a when the movable frame 14 is lifted up against force of the urging means 14c by turning the control member 14d. The movable frame 14 is pivotally supported on the shaft 14a through an elastic member 14e comprising a rubber bush, so that even when the carrier body 3 becomes slanted widthwise with the wheels 6 attached thereto picking up undulations of the road surface of the conveying passage 1, the slant of the carrier body 3 is absorbed by elastic deformation of the elastic member 14e. This prevents the movable frame 14 from being slanted widthwise and allow the driving wheel 7 to keep stable contact with the track 1a free of widthwise slanting. A cover plate 14f is attached to the top surface of the movable frame 14.

Figure 8:
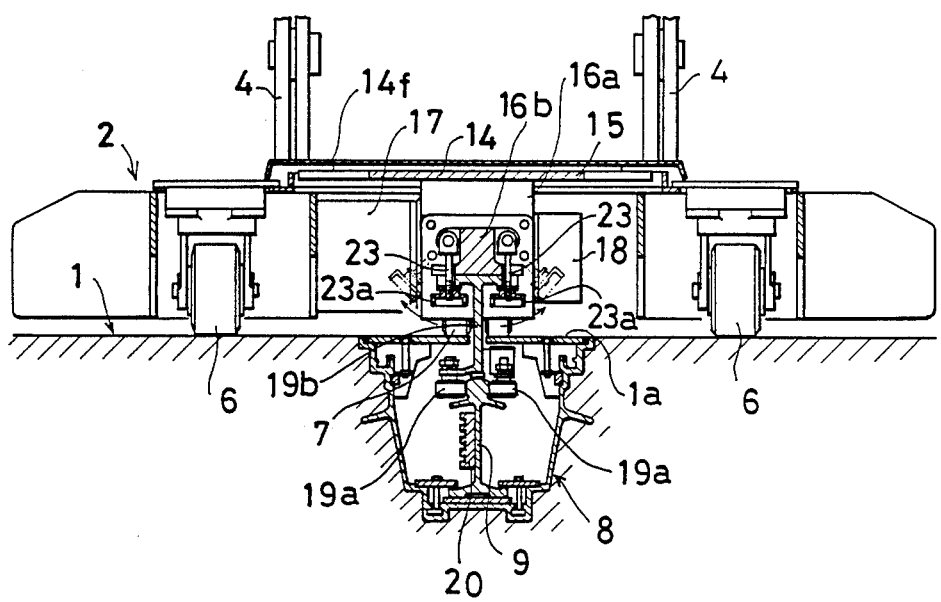

A guide member 19 engages with the guide rail 9 through a pair of front and rear guide rollers 19a. As shown in FIG. 8, a connector 19b is erected on the front portion of the guide member 19 projecting above the track 1a through the slit 1b. The connector 19b is connected to a bracket 16b projecting from the front surface of the casing 16a so that the steering frame 16 may be turned by the guide rail 9 through the guide member 19 so as to steering the driving wheel 7. In addition, a current feeder passage 20 is provided on the lower side surface of the guide rail 9. A current collector 21 is in a slidable contact with the current feeder passage 20, so that electric power from the current feeder passage 20 is supplied through the current collector 21 and a coupler 22 to the foregoing automotive motor 17 and to a driving motor (not shown) for the X-shaped link mechanism 4 on the carrier body 3.

In the above arrangement, the connector 19b is connected to the bracket 16b by a pair of bolts 23, 23 each with a nut 23a, the pair of bolts being pivotally supported on the upper portion of the bracket 16b in such a manner as to be laterally swingable. Thus, as the nut 23a is loosened to allow each bolt 23 to swing laterally outwardly toward the opening side, the guide member 19 can be separated from the steering frame 16.

In the embodiment shown in these figures, the guide member 19 is arranged with the center of the pitch between the 10 front and rear guide rollers 19a 19a thereof aligned with the steering axis line. Alternatively, the guide member 19 may be arranged so that it may engage the guide rail 9 either at the leading or trailing side of the steering axis line.

Referring to FIGS. 9 and 10, an anti-collision chain 24 engages with the foregoing slit 1b. An engagement member 25 is provided on the rear portion of the carrier body 3 which can be engaged with and disengaged from a connector 24a at the front end of the chain 24 from thereabove. Dragged by the conveying carrier 2, the chain 24 moves along the slit 1b. When the next conveying carrier 2 comes close, a stopper 19c which is a position control member attached to the front end of the guide member 19 connected to the steering frame 16 of the next conveying carrier 2 comes to abut on a stopper 24b connected to the rear end of the chain 24 so as to restrain the next conveying carrier 2 from coming any closer, so that the car bodies being carried by the two longitudinally adjacent conveying carriers 2,2 may be prevented from colliding with each other.

The foregoing chain 24 includes, as shown in FIGS. 11 and 12, a link chain comprising a plurality of links which are each connected to other through a roller 24d with a pin 24e, each of the links being composed of a pair of upper and lower plates 24c, 24c. The chain 24 is engaged with the slit 1b by the roller 24d. In addition a guide roller 24f which moves rolling on the guide rail 9 is attached to the underside surface of the chain 24 and a scalelike dust cover 24g is attached to the upper side surface thereof, using the pins 24e.

Further, a second connector 24a' is attached to a portion of the chain 24 close to the rear and thereof. The chain 24 is pulled toward the conveying carrier 2 to engage the engagement member 25 with the second connector 24a', whereby control of distance between the conveying carriers is released.

The engagement member 25 is arranged so that it can be operated not only from above the top surface of the carrier body 3 but also from both the left and right sides thereof through the pair of the left and right link mechanisms 25a, 25a, for engagement and disengagement.

Operation of the conveying apparatus according to this embodiment of the present invention will now be explained in the following.

The conveying carrier 2 is self-propelled along the conveying passage by rotation of the driving wheel 7 operated by the motor 17. At the curved portions of the conveying passage 1, the driving wheel 7 is steered by the guide rail 9 through the guide member 19 and the steering frame 16 so as to face the tangential direction of the track 1a so that the driving force directed along the track 1a is applied to the front portion of the carrier body 3 through the driving wheel 7 while the rear portion of the carrier body 3 is guided by the slit 1b through the engagement member 25 and the link chain 24. Thus, the conveying carrier 2 travels smoothly therealong even at the curved portions.

When the conveying carrier 2 gets out of order, the guide member 19 is separated from the steering frame 16. Then, the driving wheel 7 is lifted off by lifting up the movable frame 14 by means of the control member 14d, and the engagement member 25 is pulled up to be separated from the link chain 24. With the foregoing operations, the conveying carrier is now in a position to be removed freely. This, combined with the fact that the conveying passage 1 including the track 1a is formed to be flat across the entire width, permits the conveying carrier 2 to be easily pushed sidewards out of the conveying passage 1 without being caught by anything.

In the foregoing embodiment, the anti-collision chain 24 is arranged to also serve as a second guide member that guides the conveying carrier 2. Alternatively, an exclusive guide member engaging with the slit 1b and/or the guide rail 9 may be provided instead of the chain 24.

Although in the foregoing embodiment the chain 24 is guided by the slit 1b for movement, it is also possible to rearrange it so that the chain may be guided by the guide rail 9 for movement, an embodiment of which is as shown in FIG. 13. In this arrangement, the guide rail 9 comprises a sectionally U-shaped channel material that can receive a pair of the front and rear guide rollers 19a, 19a attached to the underside surface of the guide member 19 connected to the steering frame 16. As shown in FIG. 14, a chain 26 comprises a link 26b provided with a roller 26a which is rotatable about a vertical axis line, and a link 26d provided with a roller 26c which is rotatable about a horizontal axis line, these links 26b and 26d being connected to each other through an interconnecting insert piece 26g having a vertical pin 26e and a horizontal pin 26f. The chain 26 is set in the guide rail 9 in such a manner that the rollers 26a, 26c may come in contact with the inner surface of the guide rail 9, and the engagement member 25 provided on the carrier body 3 is engaged with the connector 26h attached to the front end of the chain 26. Thus, dragged by the conveying carrier 2, the chain 26 moves along the guide rail 9.

Further, a proximity switch 27 which is a position control member is provided on the conveying carrier 2 located at the front end of the guide member 19. The brake 18 becomes actuated when the switch 27 is turned on. Thus, when the following conveying carrier 2 comes close to the one moving ahead thereof, the proximity switch 27 fitted to the following conveying carrier 2 touches the rear end of the chain 26 being dragged by the conveying carrier 2 moving ahead and turned on thereby, so that the brake 18 of the following conveying carrier 2 is operated to stop the following conveying carrier 2 and prevent it from getting any closer.

In this alternative example of the present invention, the chain 26 is provided, as in case of the foregoing first embodiment example, with a second connector 26h' at a location close to the rear end thereof so that it can be pulled in toward the conveying carrier 2.

As is apparent from the foregoing description, according to the present invention, steerability or maneuverability of the conveying carrier is so improved that the conveying carrier can move smoothly along the conveying passage even at the curved portions thereof. In addition, the conveying passage is so formed to be flat across the entire width that it can also be utilized as a working space.

Further, it is easier to construct the conveying passage. It is also easier to perform maintenance work inside the pit in which the guide rail is installed.

Still further, the driving wheel is applied with such an appropriate road-contact load that it may not be subjected to slipping. The driving wheel is put stably in contact with the track and the conveying carrier can be self-propelled with rotation of the driving wheel. The conveying carrier can be easily removed out of the conveying passage when it gets out of order, so that the assembly line can resume operation without a prolonged interruption of operation. The conveying carrier can be moved accurately along the conveying passage no matter how complicated it is curved or winding, thus permitting greater freedom with respect to designing of the conveying passage.

Finally, a proper distance between the conveying carrier moving ahead and one following it can be maintained even at the curved portion of the conveying passage, so that workpieces being carried on the carriers are reliably ensured against colliding with each other.

It is readily apparent that the above-described has the advantage of wide commercial utility. It should be understood that the specific form of the invention herein above described is intended to be representative only, as certain modifications within the scope of these teachings will be apparent to those skilled in the art.

Accordingly, reference should be made to the following claims in determining the full scope of the invention.

What is claimed is:

1. A self-propelled carrier type conveying apparatus having a conveying carrier which travels along a self-propelled conveying passage, comprising:
   a pit formed at the widthwise central portion of the conveying passage;
   a guide rail laid within the pit;
   a track formed to cover a top side of the pit and be flush with a road surface of the conveying passage, said track having a slit formed at the widthwise center of the track, said slit communicating with the pit;
   a conveying carrier having a carrier body;
   a plurality of wheels attached to the conveying carrier and contacting the road surface of the conveying passage, at least the wheels adjacent a front of the carrier being casters;
   a steering frame pivotally supported on the conveying carrier and turnable about a vertical steering axis line;
   a driving wheel and a motor for driving the driving wheel, both of which are attached to the steering frame, said driving wheel being so positioned as to contact the track at a location substantially directly below said vertical steering axis line; and
   a guide member which is guided by the guide rail for movement and connected to the steering frame through the slit.

2. A self-propelled carrier type conveying apparatus as claimed in claim 1, wherein the pit is constructed of a substantially U-shaped track frame buried in the widthwise central portion of the conveying passage, and the track is formed of a pair of cover plates which are detachably mounted on the upper ends of side plates on both sides of the track frame leaving the slit therebetween.

3. A self-propelled carrier type conveying apparatus as claimed in claim 2, wherein the track frame comprises an extruded material formed to have on the inner sides thereof continuous dovetail grooves extending in the longitudinal direction and wherein one track frame is connected to the other track frame by way of a dovetail-shaped joint member which engages with the dovetail grooves of both the track frames at the joint portions.

4. A self-propelled carrier type conveying apparatus as claimed in one of claims 2 or 3, wherein the track frame is provided with at least one channel groove receiving therein nuts for fastening the guide rail to the track frame, said at least one channel groove being formed continuously in the longitudinal direction of the track frame.

5. A self-propelled carrier type conveying apparatus as claimed in claim 1, wherein the steering frame is pivotally supported on a movable frame which is provided on the carrier body of the conveying carrier and further comprising an urging means for urging said moveable frame downwardly.

6. A self-propelled carrier type conveying apparatus as claimed in claim 5, wherein the movable frame is pivotally supported at one of its front and rear ends on the carrier body and is vertically swingable, and an elastic member is fitted to said pivotally supported portion so that the movable frame may be tilted in the widthwise direction with respect to the carrier body.

7. A self-propelled carrier type conveying apparatus as claimed in one of claims 5 or 6, wherein the guide member is separable from the steering frame; and further comprises a control member used to lift up the movable frame against force of the urging means.

8. A self-propelled carrier type conveying apparatus as claimed in claim 1, wherein every one of the wheels attached to the conveying carrier except the driving wheel is a caster, a second guide member is provided whose movement is guided by one of the slit and the guide rail, and the conveying carrier has an engagement member for engaging with the second guide member, said engagement member being located to be spaced form the driving wheel in the longitudinal direction.

9. A self-propelled carrier type conveying apparatus as claimed in claim 8, wherein the second guide member consists of a chain which is so arranged that when one end thereof is engaged with the engagement member, the other end thereof may be located in front of or at the rear of the conveying carrier, and another conveying carrier immediately preceding or following said conveying carrier is provided with a position control member facing the other end of said chain.

10. A self-propelled carrier type conveying apparatus as claimed in claim 1, further comprising a chain whose movement is guided by one of the slit and the guide rail, one end of said chain being connected to said conveying carrier in such a manner as to have the other end thereof located in front of or at the rear of the carrier, and another conveying carrier immediately preceding or following said conveying carrier is provided with a position control member facing the other end of said chain.

11. A self-propelled carrier type conveying apparatus as claimed in claim 9 or 10, wherein the position control member comprises a stopper adapted be able to abut on said other end of said chain.

12. A self-propelled carrier type conveying apparatus as claimed in claim 9 or 10, wherein the position control member comprises a proximity detecting means which becomes turned on or off to operate a brake means of said another conveying carrier when it abuts on said other end of said chain.

* * * * *